Patented July 22, 1924.

1,502,547

UNITED STATES PATENT OFFICE.

ROBERT CALVERT, KARL L. DERN, AND GORDON A. ALLES, OF LOMPOC, CALIFORNIA.

DIATOMACEOUS EARTH PRODUCT AND PROCESS OF MAKING THE SAME.

No Drawing.   Application filed November 6, 1922. Serial No. 599,434.   REISSUED

*To all whom it may concern:*

Be it known that we, ROBERT CALVERT, KARL L. DERN, and GORDON A. ALLES, all citizens of the United States, residing at Lompoc, in the county of Santa Barbara and State of California, have invented a new and useful Diatomaceous Earth Product and Process of Making the Same, of which the following is a specification.

This invention relates to the treatment of diatomaceous earth, otherwise known as infusoral earth or kieselguhr, for the purpose of improving its quality, rendering it more effective for various purposes and particularly for use in the clarification and filtration of liquors, such as solutions of raw sugar in water.

It has been found that by mixing diatomaceous earth, with a small proportion of any of several different chemicals, particularly sodium chloride and heating the mixture to a suitable temperature, a substantially new product is formed, such product being in general substantially white in color, of lower apparent density than the earth from which it was prepared. Also that when the material so prepared is used as a filter-aid or filtering agent in the clarification or filtration of sugar or other solutions, it has a much greater filtering efficiency or filtering capacity than the original material. The present invention is based on this discovery and its object is to provide by treatment of diatomaceous earth in this manner, a product which is of greater commercial value, more attractive appearance and better adapted for use as a filter aid or for other purpose for which diatomaceous earth is used, for example, as an insulating material, as an ingredient in soaps, paints, dental preparations or other compositions or articles where lightness in weight, softness or fluffiness, fine subdivision and pure white color are essential or desirable.

Diatomaceous earth calcined in the presence of added salts of alkali forming metals and then re-disintegrating after calcination has been found to be especially effective when used as a filtration material.

The diatomaceous earth product produced in accordance with our invention will be found to be greatly increased in efficiency and utility when used in the clarification, purification and filtration of animal, marine, vegetable, and mineral oils; solutions of sugars or salts; waste liquids; and any other solutions or mixtures which can be clarified, purified, or filtered by the use of diatomaceous earth.

The process may be carried out as follows: One hundred pounds diatomaceous earth is mixed with five pounds of sodium chloride (common salt) and the mixture is then ground so as to reduce both the diatomaceous earth and the salt to a state of powder or fine division and to give an intimate mixture. The mixture is then charged into a muffle furnace and heated to about 1800° F., at which temperature it is maintained for one hour. The product is then removed from the furnace, and reground to form of powder, if necessary, although in some cases such regrinding is not required.

The product so obtained has been tested for efficiency as a filter aid or filtration accelerator, in the following manner: Sixty pounds raw cane sugar is dissolved in forty pounds water at 80 degrees C., and to the solution is added 0.8 pounds of the calcined product produced as above described. On pumping through a filter-press with a surface area of .37 square feet, there is obtained in 12 minutes a filtrate weighing 35 pounds as compared with only 6.4 pounds when diatomaceous earth without this treatment is used.

While it is not attempted to define the exact nature of the change that is effected in the diatomaceous earth by the stated operation, it may be stated that one advantageous effect of the addition of sodium chloride is presumably that it lowers the sintering point of the diatomaceous earth and particularly of the clay content thereof, so as to enable the finer particles of the material (siliceous dust) to be sintered together or to the larger particles, thereby doing away with the excessively fine particles that might tend to clog the filters. For this reason the temperature of calcination may be defined as that which is sufficiently high to produce incipient fusion, such incipient fusion being defined as a condition at which the particles under the action of heat begin to show a noticeable tendency to adhere, to form weak lumps, or aggregates, or the condition in which there begins to occur such a change that the product after cooling shows a markedly decreased resistance to the flow therethrough of any of the various liquids such as, for instance, a 60 per cent solution of sugar in water. Presumably, also, the sodium chloride, at temperatures above its melting point, at which temperatures it has sufficient vapor pressure to diffuse throughout the porous mass of diatomaceous earth, reacts with the silica of the diatomaceous earth in the presence of moisture to produce sodium silicate and hydrochloric acid, and the hydrochloric acid so liberated may act on any iron compounds present to form volatile chlorides which pass off as vapor, so that the resulting product is comparatively free from acid soluble iron, and is correspondingly lighter in color and better adapted to many purposes where the presence of iron is detrimental. The sodium silicate, produced as stated, or the sodium chloride itself, acts as a flux for the finer particles, since in such cases, as stated in "Applied Colloid Chemistry" (W. D. Bancroft, 1921, page 152) the finest particles will have a lower temperature of fusion and will fuse first. Thus the selective fusion of the finest powder in the diatomaceous earth and of the clay present, removes or changes, in such a way so as to render less objectionable, these materials which in ordinary use of diatomaceous earth as a filtration accelerator, tend to retard the action of the accelerator. The sodium chloride or other fluxing agent, may act also in such manner as to facilitate to an appreciable extent the transformation of silica to one of the crystalline modifications which are known to be formed at very high temperatures more readily in the presence of salts or fluxing agents than otherwise. Other changes may also presumably occur and use is made of all such changes or effects of the heating of diatomaceous earth with sodium chloride.

Apparently the operation above described has the effect of swelling or intumescing the diatomaceous earth so that it occupies a larger volume, and is correspondingly lighter and more porous.

The product produced by the process, is considerably lighter in weight than the ordinary diatomaceous earth which has not been subjected to the treatment, the material produced by the process as described occupying more than fifty per cent greater volume than the same weight of ordinary diatomaceous earth. The weight of the diatomaceous earth treated as described, is about ten pounds per cubic foot (wet density) as compared with a weight of about seventeen pounds per cubic foot in the case of ordinary untreated powdered diatomaceous earth. This increase in bulkiness is permanent. The diatomaceous earth, due to this treatment, has been made permanently of more open porous structure. By wet density is meant the density calculated from the minimum bulk occupied by this material when immersed in water.

Various other metallic salts or compounds may be used in place of the sodium chloride, for example, calcium chloride, magnesium chloride, or any chloride or halide of any alkali forming metals, that is to say, an alkali metal or alkaline earth metal, or other salts, such as borax, or sodium nitrate, or alkalies, or other fluxing agents.

In the above stated operation, the amount of sodium chloride used may be so regulated that only a trace of same remains in the finished product. Salt of almost any degree of purity may be used, and a smaller or larger proportion of salt may be used than the five per cent mentioned above. The temperature used may be lower or higher than above specified, but lower temperatures give a product of less desirable properties and higher temperatures are more costly to maintain and are liable to result in fusion of the larger particles to form a slag.

Any suitable apparatus may be used for carrying out the process, for example, a rotary kiln may be used in place of the muffle furnace. The diatomaceous earth and sodium chloride may be interground, as stated, or they may be separately ground and then mixed, or a part of same may be interground and then mixed with powdered diatomaceous earth. Or the sodium chloride, or other salt or chemical used, may be dissolved in water and the diatomaceous earth wetted with the solution and then ground, either with or without predrying.

As an example of these variations the following method, although varying from the preferred method described above, has been very successfully used in commercially producing this product. An oil fired rotary kiln 6 ft. in diameter and 100 ft. long was continuously fed with the diatomaceous earth which had been milled, but not completely dried, as is customary, so that almost 20 per cent moisture was present. A technical grade of sodium chloride was fed into the feeding mechanism at about 5 per cent on a total weight of diatomaceous earth.

The temperature of the kiln varied from about 1900° F. in the firing and discharge zone to about 1000° F. at the feed end. The calcined material was cooled and then passed through a fan so as to break up the larger particles formed during burning. Under certain conditions it may be desirable to incorporate salts of alkali forming metals in the form of a solution and then calcining, and we have found that the operation may be quickly and successfully carried out in this manner.

What we claim is:

1. The process which consists in mixing finely divided diatomaceous earth with a material adapted to lower the sintering point thereof and then calcining at a temperature sufficient to sinter the siliceous dust in the material but not sufficient to sinter the mass.

2. The process which consists in mixing diatomaceous earth with a material adapted to lower the sintering point of the clay present, and then calcining the mixture, at a temperature sufficient to produce incipient fusion and reducing the calcined product to a state of fine division.

3. The process which consists in mixing diatomaceous earth with a halide of an alkali forming metal and calcining the mixture.

4. A process as set forth in claim 3, including as an additional step reducing the calcined product to a state of fine division.

5. The process which consists in mixing diatomaceous earth with sodium chloride and calcining the mixture at a temperature sufficiently high to cause reaction between the sodium chloride and the diatomaceous earth.

6. A process as set forth in claim 5, including as an additional step reducing the calcined product to a state of fine division.

7. The process which consists in mixing diatomaceous earth with five per cent of sodium chloride and calcining the mixture at a temperature above the melting point of sodium chloride.

8. The process which consists in mixing diatomaceous earth with sodium chloride and calcining the mixture at a temperature above the melting point of sodium chloride.

9. The process which consists in mixing diatomaceous earth with sodium chloride and calcining the mixture at about 1800° F.

10. The process which consists in producing an intimate mixture of diatomaceous earth with a chloride of an alkali forming metal, calcining the mixture and reducing the calcined product to a state of fine division.

11. The process which consists in producing a mixture of a salt of an alkali forming metal with finely ground diatomaceous earth, and calcining the mixture at a temperature above the melting point of such salt.

12. A process as set forth in claim 11, and comprising in addition finely dividing the calcined product.

13. The process which consists in intergrinding diatomaceous earth with a salt of an alkali forming metal, and calcining the resulting mixture at a temperature of incipient fusion.

14. The process which consists in intergrinding diatomaceous earth with a salt of an alkali forming metal, calcining the resulting mixture at a temperature of incipient fusion, and reducing the calcined product.

15. The process which consists in mixing and heating finely divided diatomaceous earth with a substance capable of causing intumescence of the mixture when so heated, and disintegrating the product.

16. The process which consists in mixing and heating diatomaceous earth with a substance capable of causing intumescence of the mixture when so heated, so as to produce a product which is of lighter weight than the diatomaceous earth used in the mixture, and disintegrating the calcined product.

17. The process which consists in mixing diatomaceous earth with a substance capable of reacting with metallic impurities therein to form volatile products; heating such mixture at sufficiently high temperature to effect such reaction; thereby driving off and removing acid soluble iron impurities from the diatomaceous earth; and reducing the calcined product to a state of fine division.

18. A finely divided diatomaceous earth product consisting of the product of calcination of diatomaceous earth with a salt of an alkali forming metal, such calcination being effected above the melting point of such salt, and the earth being finely divided after calcination.

19. A diatomaceous earth product having a pure white color and having a wet density, in finely divided condition of about ten pounds per cubic foot and consisting of the product of calcination of diatomaceous earth with a salt of an alkali forming metal, such calcination being effected above the melting point of such salt.

20. As an article of manufacture, a diatomaceous earth product as set forth in claim 19, finely divided after calcination.

21. The process which consists in forming a finely divided mixture of diatomaceous earth with a salt of an alkali forming metal and calcining such finely divided mixture at a temperature above the melting point of such salt and in such a manner as to avoid sintering of the mass.

22. A new article of manufacture consisting of a calcined finely divided mixture of diatomaceous earth and a halide of an alkali forming metal.

23. A diatomaceous earth product consisting of the product of calcination of a mixture of finely ground diatomaceous earth and sodium chloride.

24. As an article of manufacture, a diatomaceous earth product as set forth in claim 23, finely divided after calcination.

25. A diatomaceous earth product having a white color and a bulk density in finely divided condition of about ten pounds per cubic foot and consisting of the product of calcination of diatomaceous earth with sodium chloride.

26. As a new article of manufacture, a diatomaceous earth product as set forth in claim 25, finely divided after calcination.

In testimony whereof we have hereunto subscribed our names this 25th day of October, 1922.

ROBERT CALVERT.
KARL L. DERN.
GORDON A. ALLES.